United States Patent
Noyes

(10) Patent No.: US 10,086,349 B2
(45) Date of Patent: Oct. 2, 2018

(54) REACTORS, SYSTEMS, AND METHODS FOR FORMING SOLID PRODUCTS

(71) Applicant: Seerstone LLC, Provo, UT (US)

(72) Inventor: Dallas B. Noyes, Provo, UT (US)

(73) Assignee: SEERSTONE LLC, Provo, UT (US)

( * ) Notice: Subject to any disclaimer, the term of this patent is extended or adjusted under 35 U.S.C. 154(b) by 183 days.

(21) Appl. No.: 14/775,913

(22) PCT Filed: Mar. 12, 2014

(86) PCT No.: PCT/US2014/025074
§ 371 (c)(1),
(2) Date: Sep. 14, 2015

(87) PCT Pub. No.: WO2014/151138
PCT Pub. Date: Sep. 25, 2014

(65) Prior Publication Data
US 2016/0016800 A1    Jan. 21, 2016

Related U.S. Application Data

(60) Provisional application No. 61/790,102, filed on Mar. 15, 2013.

(51) Int. Cl.
*B01J 8/02* (2006.01)
*C01B 32/164* (2017.01)
(Continued)

(52) U.S. Cl.
CPC .............. *B01J 8/0278* (2013.01); *B01J 8/003* (2013.01); *B01J 8/0045* (2013.01); *B01J 8/0242* (2013.01);
(Continued)

(58) Field of Classification Search
CPC ........ B01J 8/003; B01J 8/0035; B01J 8/0015; B01J 8/0278; B01J 8/0492; B01J 8/0453;
(Continued)

(56) References Cited

U.S. PATENT DOCUMENTS

| | | |
|---|---|---|
| 1,478,730 A | 12/1923 | Brownlee et al. |
| 1,735,925 A | 11/1929 | Jaeger |
| | (Continued) | |

FOREIGN PATENT DOCUMENTS

| | | |
|---|---|---|
| EP | 1903001 A2 | 3/2008 |
| JP | 2000072981 A | 3/2000 |
| | (Continued) | |

OTHER PUBLICATIONS

Wiegand et al., Fabrication of High Strength Metal-Carbon Nanotube Composites, U.S. Army Research and Development, Picatinny, New Jersey, and New Jersey Institute of Technology, Newark, New Jersey, report date Dec. 2008, 6 pages.
(Continued)

*Primary Examiner* — Lessanework T Seifu
(74) *Attorney, Agent, or Firm* — TraskBritt, P.C.

(57) ABSTRACT

A reactor includes a vessel, a gas inlet, a solid outlet, a catalyst support configured to at least partially retain a catalyst material and allow a tail gas to pass therethrough, and a tail gas outlet. The gas inlet is in fluid communication with the solid outlet. A system for producing a solid product includes a reactor, a compressor, a heater, a make-up reactive gas inlet, and a solids discharge means for removing the solid product from the solid outlet of the reactor. Methods of forming solid products include providing a catalyst material in a vessel having a porous catalyst support, delivering a reactive gas to the vessel, reacting the reactive gas to form a solid product and a tail gas in the vessel, passing the tail gas through a portion of the catalyst material to separate the solid product from the tail gas, and removing the solid product.

19 Claims, 5 Drawing Sheets

(51) Int. Cl.
  *B01J 8/04* (2006.01)
  *B01J 8/00* (2006.01)
  *C01B 32/05* (2017.01)
  *C01B 32/16* (2017.01)

(52) U.S. Cl.
  CPC ........... B01J 8/0285 (2013.01); B01J 8/0438 (2013.01); B01J 8/0453 (2013.01); B01J 8/0492 (2013.01); C01B 32/05 (2017.08); C01B 32/16 (2017.08); C01B 32/164 (2017.08); *B01J 2208/00176* (2013.01); *B01J 2208/00752* (2013.01); *B01J 2208/00761* (2013.01); *B01J 2208/00884* (2013.01); *B01J 2208/00893* (2013.01); *B01J 2208/00938* (2013.01); *B01J 2208/024* (2013.01); *B01J 2208/025* (2013.01)

(58) Field of Classification Search
  CPC ......... B01J 8/0242; B01J 8/0045; C09C 1/50; C09C 1/52; C09C 1/54; C09C 1/56; C01B 32/16; C01B 32/164
  See application file for complete search history.

(56) References Cited

U.S. PATENT DOCUMENTS

| | | | |
|---|---|---|---|
| 1,964,744 A | 7/1934 | Odell | |
| 2,378,138 A * | 6/1945 | Gaylor | B01J 19/0013 422/200 |
| 2,429,980 A | 11/1947 | Allinson | |
| 2,440,424 A | 4/1948 | Wiegand et al. | |
| 2,494,337 A * | 1/1950 | Hemminger | B01J 8/189 261/114.1 |
| 2,796,331 A | 6/1957 | Kauffman et al. | |
| 3,172,774 A | 3/1965 | Diefendorf | |
| 3,378,345 A | 4/1968 | Bourdeau et al. | |
| 3,634,999 A | 1/1972 | Howard et al. | |
| 3,787,188 A * | 1/1974 | Lyon | B01J 8/001 422/198 |
| 4,126,000 A | 11/1978 | Funk | |
| 4,602,477 A | 7/1986 | Lucadamo et al. | |
| 4,663,230 A | 5/1987 | Tennett | |
| 4,665,143 A * | 5/1987 | Ahluwalia | B01J 8/0015 526/86 |
| 4,710,483 A | 12/1987 | Burk et al. | |
| 4,727,207 A | 2/1988 | Paparizos et al. | |
| 5,149,584 A | 9/1992 | Baker et al. | |
| 5,260,043 A | 11/1993 | Li et al. | |
| 5,413,866 A | 5/1995 | Baker et al. | |
| 5,456,897 A | 10/1995 | Moy et al. | |
| 5,457,343 A | 10/1995 | Ajayan et al. | |
| 5,531,424 A | 7/1996 | Whipp | |
| 5,569,635 A | 10/1996 | Moy et al. | |
| 5,572,544 A | 11/1996 | Mathur et al. | |
| 5,578,543 A | 11/1996 | Tennent et al. | |
| 5,589,152 A | 12/1996 | Tennent et al. | |
| 5,641,466 A | 6/1997 | Ebbesen et al. | |
| 5,648,056 A | 7/1997 | Tanaka | |
| 5,650,370 A | 7/1997 | Tennent et al. | |
| 5,691,054 A | 11/1997 | Tennent et al. | |
| 5,707,916 A | 1/1998 | Snyder et al. | |
| 5,726,116 A | 3/1998 | Moy et al. | |
| 5,747,161 A | 5/1998 | Iijima | |
| 5,780,101 A | 7/1998 | Nolan et al. | |
| 5,877,110 A | 3/1999 | Snyder et al. | |
| 5,965,267 A | 10/1999 | Nolan et al. | |
| 5,997,832 A | 12/1999 | Lieber et al. | |
| 6,099,965 A | 8/2000 | Tennent et al. | |
| 6,159,892 A | 12/2000 | Moy et al. | |
| 6,183,714 B1 | 2/2001 | Smalley et al. | |
| 6,203,814 B1 | 3/2001 | Fisher et al. | |
| 6,221,330 B1 | 4/2001 | Moy et al. | |
| 6,232,706 B1 | 5/2001 | Dai et al. | |
| 6,239,057 B1 | 5/2001 | Ichikawa et al. | |
| 6,261,532 B1 | 7/2001 | Ono | |
| 6,262,129 B1 | 7/2001 | Murray et al. | |
| 6,294,144 B1 | 9/2001 | Moy et al. | |
| 6,333,016 B1 | 12/2001 | Resasco et al. | |
| 6,346,189 B1 | 2/2002 | Dai | |
| 6,361,861 B2 | 3/2002 | Gao | |
| 6,375,917 B1 | 4/2002 | Mandeville et al. | |
| 6,413,487 B1 | 7/2002 | Resasco et al. | |
| 6,423,288 B2 | 7/2002 | Mandeville et al. | |
| 6,426,442 B1 | 7/2002 | Ichikawa et al. | |
| 6,465,813 B2 | 10/2002 | Ihm | |
| 6,518,218 B1 | 2/2003 | Sun et al. | |
| 6,596,101 B2 | 7/2003 | Weihs et al. | |
| 6,645,455 B2 | 11/2003 | Margrave et al. | |
| 6,683,783 B1 | 1/2004 | Smalley et al. | |
| 6,686,311 B2 | 2/2004 | Sun et al. | |
| 6,692,717 B1 | 2/2004 | Smalley et al. | |
| 6,713,519 B2 | 3/2004 | Wang et al. | |
| 6,749,827 B2 | 6/2004 | Smalley et al. | |
| 6,761,870 B1 | 7/2004 | Smalley et al. | |
| 6,783,572 B1 * | 8/2004 | Squires | B01D 46/0075 422/216 |
| 6,790,425 B1 | 9/2004 | Smalley et al. | |
| 6,800,369 B2 | 10/2004 | Gimzewski et al. | |
| 6,827,918 B2 | 12/2004 | Margrave et al. | |
| 6,827,919 B1 | 12/2004 | Moy et al. | |
| 6,835,330 B2 | 12/2004 | Nishino et al. | |
| 6,835,366 B1 | 12/2004 | Margrave et al. | |
| 6,841,139 B2 | 1/2005 | Margrave et al. | |
| 6,855,301 B1 | 2/2005 | Rich et al. | |
| 6,875,412 B2 | 4/2005 | Margrave et al. | |
| 6,890,986 B2 | 5/2005 | Pruett | |
| 6,899,945 B2 | 5/2005 | Smalley et al. | |
| 6,905,544 B2 | 6/2005 | Setoguchi et al. | |
| 6,913,740 B2 | 7/2005 | Polverejan et al. | |
| 6,913,789 B2 | 7/2005 | Smalley et al. | |
| 6,916,434 B2 | 7/2005 | Nishino et al. | |
| 6,919,064 B2 | 7/2005 | Resasco et al. | |
| 6,936,233 B2 | 8/2005 | Smalley et al. | |
| 6,949,237 B2 | 9/2005 | Smalley et al. | |
| 6,955,800 B2 | 10/2005 | Resasco et al. | |
| 6,960,389 B2 | 11/2005 | Tennent et al. | |
| 6,962,685 B2 | 11/2005 | Sun | |
| 6,979,709 B2 | 12/2005 | Smalley et al. | |
| 6,986,876 B2 | 1/2006 | Smalley et al. | |
| 6,998,358 B2 | 2/2006 | French et al. | |
| 7,011,771 B2 | 3/2006 | Gao et al. | |
| 7,041,620 B2 | 5/2006 | Smalley et al. | |
| 7,045,108 B2 | 5/2006 | Jiang et al. | |
| 7,048,999 B2 | 5/2006 | Smalley et al. | |
| 7,052,668 B2 | 5/2006 | Smalley et al. | |
| 7,067,098 B2 | 6/2006 | Colbert et al. | |
| 7,071,406 B2 | 7/2006 | Smalley et al. | |
| 7,074,379 B2 | 7/2006 | Moy et al. | |
| 7,094,385 B2 | 8/2006 | Beguin et al. | |
| 7,094,386 B2 | 8/2006 | Resasco et al. | |
| 7,094,679 B1 | 8/2006 | Li et al. | |
| 7,097,820 B2 | 8/2006 | Colbert et al. | |
| 7,105,596 B2 | 9/2006 | Smalley et al. | |
| 7,125,534 B1 | 10/2006 | Smalley et al. | |
| 7,132,062 B1 | 11/2006 | Howard | |
| 7,135,159 B2 | 11/2006 | Shaffer et al. | |
| 7,135,160 B2 | 11/2006 | Yang et al. | |
| 7,150,864 B1 | 12/2006 | Smalley et al. | |
| 7,157,068 B2 | 1/2007 | Li et al. | |
| 7,160,532 B2 | 1/2007 | Liu et al. | |
| 7,169,329 B2 | 1/2007 | Wong et al. | |
| 7,201,887 B2 | 4/2007 | Smalley et al. | |
| 7,204,970 B2 | 4/2007 | Smalley et al. | |
| 7,205,069 B2 | 4/2007 | Smalley et al. | |
| 7,214,360 B2 | 5/2007 | Chen et al. | |
| 7,250,148 B2 | 7/2007 | Yang et al. | |
| 7,270,795 B2 | 9/2007 | Kawakami et al. | |
| 7,291,318 B2 | 11/2007 | Sakurabayashi et al. | |
| 7,338,648 B2 | 3/2008 | Harutyunyan et al. | |
| 7,365,289 B2 | 4/2008 | Wilkes et al. | |
| 7,374,793 B2 | 5/2008 | Furukawa et al. | |
| 7,390,477 B2 | 6/2008 | Smalley et al. | |
| 7,396,798 B2 | 7/2008 | Ma et al. | |

(56) References Cited

U.S. PATENT DOCUMENTS

| | | |
|---|---|---|
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Suekane et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,879,398 B2 | 2/2011 | Kim et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin et al. |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,486,362 B2 | 7/2013 | Fugetsu |
| 8,679,444 B2 | 3/2014 | Noyes |
| 8,865,613 B2 | 10/2014 | Mordkovich et al. |
| 9,090,472 B2 | 7/2015 | Noyes |
| 9,221,685 B2 | 12/2015 | Noyes |
| 9,327,970 B2 | 5/2016 | Nakamura et al. |
| 2002/0054849 A1 | 5/2002 | Baker et al. |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0172767 A1 | 11/2002 | Grigorian et al. |
| 2002/0173420 A1 | 11/2002 | Cantrell et al. |
| 2003/0059364 A1 | 3/2003 | Prilutskiy |
| 2003/0147802 A1 | 8/2003 | Smalley et al. |
| 2004/0035355 A1 | 2/2004 | Avouris et al. |
| 2004/0053440 A1 | 3/2004 | Lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0150312 A1 | 8/2004 | McElrath et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0238810 A1 | 10/2005 | Scaringe et al. |
| 2005/0244325 A1 | 11/2005 | Nam et al. |
| 2005/0276743 A1 | 12/2005 | Lacombe et al. |
| 2006/0013757 A1 | 1/2006 | Edwin et al. |
| 2006/0045837 A1 | 3/2006 | Nishimura |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0133990 A1 | 6/2006 | Hyeon et al. |
| 2006/0143980 A1 | 7/2006 | Rapier et al. |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2006/0286022 A1 | 12/2006 | Miyamoto et al. |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0172409 A1 | 7/2007 | Hikata |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0193367 A1 | 8/2008 | Kalck et al. |
| 2008/0217588 A1 | 9/2008 | Arnold et al. |
| 2008/0221227 A1 | 9/2008 | Christensen et al. |
| 2008/0226538 A1 | 9/2008 | Rumpf et al. |

(56) References Cited

U.S. PATENT DOCUMENTS

| | | |
|---|---|---|
| 2008/0233402 A1 | 9/2008 | Carlson et al. |
| 2008/0239620 A1 | 10/2008 | Min et al. |
| 2008/0260618 A1 | 10/2008 | Kawabata |
| 2008/0263954 A1 | 10/2008 | Hammel et al. |
| 2008/0274277 A1 | 11/2008 | Rashidi et al. |
| 2008/0279753 A1 | 11/2008 | Harutyunyan |
| 2008/0280136 A1 | 11/2008 | Zachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0022652 A1 | 1/2009 | Sato et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0075157 A1 | 3/2009 | Pak et al. |
| 2009/0081454 A1 | 3/2009 | Axmann et al. |
| 2009/0087622 A1 | 4/2009 | Busnaina et al. |
| 2009/0124705 A1 | 5/2009 | Meyer et al. |
| 2009/0136413 A1 | 5/2009 | Li et al. |
| 2009/0140215 A1 | 6/2009 | Buchholz et al. |
| 2009/0176100 A1 | 7/2009 | Higashi et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0291030 A1 | 11/2009 | Edwin et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0009204 A1 | 1/2010 | Noguchi et al. |
| 2010/0034725 A1 | 2/2010 | Harutyunyan |
| 2010/0047152 A1 | 2/2010 | Whelan et al. |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0104849 A1 | 4/2010 | Lashmore et al. |
| 2010/0129654 A1 | 5/2010 | Jiang et al. |
| 2010/0132883 A1 | 6/2010 | Burke et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0209696 A1 | 8/2010 | Seals et al. |
| 2010/0210878 A1 | 8/2010 | Naeemi et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0258446 A1 | 10/2010 | Mohapatra et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0303675 A1 | 12/2010 | Suekane et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0120138 A1 | 5/2011 | Gaiffi et al. |
| 2011/0142745 A1 | 6/2011 | Feng et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0212016 A1 | 9/2011 | Lee et al. |
| 2012/0080313 A1 | 4/2012 | Baumgart et al. |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2012/0149824 A1 | 6/2012 | Hocke et al. |
| 2012/0258371 A1 | 10/2012 | Nakanishi et al. |
| 2012/0321544 A1* | 12/2012 | Takai ............... B01J 23/745 423/447.3 |
| 2013/0315813 A1 | 11/2013 | Chang et al. |
| 2014/0021827 A1 | 1/2014 | Noyes |
| 2014/0086820 A1 | 3/2014 | Nakamura et al. |
| 2014/0141248 A1 | 5/2014 | Noyes |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071848 A1 | 3/2015 | Denton et al. |
| 2015/0078981 A1 | 3/2015 | Noyes |
| 2015/0086468 A1 | 3/2015 | Noyes |
| 2015/0093323 A1 | 4/2015 | Koveal, Jr. et al. |
| 2015/0114819 A1 | 4/2015 | Denton et al. |
| 2015/0147259 A1 | 5/2015 | Noyes |
| 2015/0147261 A1 | 5/2015 | Denton et al. |
| 2015/0225242 A1 | 8/2015 | Noyes |
| 2015/0291424 A1 | 10/2015 | Noyes |
| 2015/0321918 A1 | 11/2015 | Noyes |
| 2016/0016794 A1 | 1/2016 | Noyes |
| 2016/0016800 A1 | 1/2016 | Noyes |
| 2016/0016862 A1 | 1/2016 | Noyes |
| 2016/0023902 A1 | 1/2016 | Noyes |
| 2016/0027934 A1 | 1/2016 | Noyes |
| 2016/0030925 A1 | 2/2016 | Noyes |
| 2016/0030926 A1 | 2/2016 | Noyes |
| 2016/0031710 A1 | 2/2016 | Noyes et al. |
| 2016/0039677 A1 | 2/2016 | Noyes |
| 2016/0156051 A1 | 6/2016 | Chua et al. |

FOREIGN PATENT DOCUMENTS

| | | |
|---|---|---|
| JP | 2002100787 A | 4/2002 |
| JP | 3339339 B2 | 10/2002 |
| JP | 2004360099 A | 12/2004 |
| JP | 2005272277 A | 10/2005 |
| WO | 0230816 A1 | 4/2002 |
| WO | 03018474 A1 | 3/2003 |
| WO | 2005103348 A1 | 11/2005 |
| WO | 2006003482 A2 | 1/2006 |
| WO | 2006130150 A2 | 12/2006 |
| WO | 2007126412 A2 | 11/2007 |
| WO | 2009122139 A1 | 10/2009 |
| WO | 2009145959 A1 | 12/2009 |
| WO | 2010087903 A1 | 8/2010 |
| WO | 2010146169 A2 | 12/2010 |

(56) References Cited

FOREIGN PATENT DOCUMENTS

| WO | 2011009071 A1 | 1/2011 |
|----|---------------|--------|
| WO | 2013032439 A1 | 3/2013 |
| WO | 2014/151138   | 3/2014 |

OTHER PUBLICATIONS

Abatzoglou, Nicolas et al., "The use of catalytic reforming reactions for C02 sequestration as carbon nanotubes," Proceedings of the 2006 IASME/WSEAS International Conference on Energy & Environmental Systems, Chalkida, Greece, May 8-10, 2006 (pp. 21-26) (available at: http://www.wseas.us/e-library/conferences/2006evia/papers/516-19 3.pdf).

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

Database WPI Week 198920 Thomson Scientific, London, GB; AN 1989-148422 XP002719593, & JP H01 92425 A (Nippon Kokan KK) Apr. 11, 1989 (Apr. 11, 1989).

Cha, S. I., et al., "Mechanical and electrical properties of cross-linked carbon nanotubes," Carbon 46 (2008) 482-488, Elsevier, Ltd.

Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journai/1998/98_APL_72_3282-ChengH M.pdf).

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO—H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics Letters 260 (1996) 471-475, Elsevier.

Dresselhaus et al., Carbon Nanotubes Synthesis, Structure, Properties, and Applications. 2001, pp. 1-9, Springer.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.

Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_19710002858.

Huang, Z.P., et al., "Growth of highly oriented carbon nanotubes by plasma-enhanced hot filament chemical vapor deposition," Applied Physics Letters 73:3845-3847, Dec. 28, 1998.

"INCONEL® alloy 693—Excellent Resistance to Metal Dusting and High Temperature Corrosion" Special Metals Product Sheet, 2005.

Unknown author, "Metal Dusting," unknown publisher, undated.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

Lal, Archit, "Effect of Gas Composition and Carbon Activity on the Growth of Carbon Nanotubes," Masters Thesis, University of Florida, 2003.

Unknown author, "Metal Dusting of reducing gas furnace HK40 tube," unknown publisher, undated.

Manning, Michael Patrick, "An Investigation of the Bosch Process," PhD Dissertation, Massachusetts Institute of Technology, Jan. 1976.

Muller-Lorenz and Grabke, Coking by metal dusting of steels, 1999, Materials and Corrosion 50, 614-621 (1999).

SAE 820875 Utilization of Ruthenium and Ruthenium-Iron Alloys as Bosch Process Catalysts. Jul. 19-21, 1982.

SAE 911451 Optimization of Bosch Reaction, Jul. 15-18, 1991.

Nasibulin, Albert G., et al., "An essential role of C02 and H20 during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina-nanofibers-and-composites).

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during C02 Reforming of CH4 over Co/?—Al203 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Szakalos, P., "Mechanisms and driving forces of metal dusting," Materials and Corrosion, 2003, 54, No. 10, pp. 752-762.

Tsai, Heng-Yi, et al., "A feasibility study of preparing carbon nanotubes by using a metal dusting process," Diamond & Related Materials 18 (2009) 324-327, Elsevier.

Wilson, Richard B., "Fundamental Investigation of the Bosch Reaction," PhD Dissertation, Massachusetts Institute of Technology, Jul. 1977, pp. 12,23, 37, 43, 44, 62, 70, 80, 83-88, 98.

Wei, et al. "The mass production of carbon nanotubes using a nano-agglomerate fluidized bed reactor: A multiscale space-time analysis," Powder Technology 183 (2008) 10-20, Elsevier.

Zeng, Z., and Natesan, K., Relationship between the Growth of Carbon Nanofilaments and Metal Dusting Corrosion, 2005, Chem. Mater. 2005, 17, 3794-3801.

Camilli et al., The synthesis and characterization of carbon nanotubes grown by chemical vapor deposition using a stainless steel catalyst, Carbon, 2011, pp. 3307-3315, vol. 49, No. 10.

PCT International Written Opinion, PCT/US2014/025074, dated Jul. 28, 2014.

PCT International Preliminary Report on Patentability, PCT/US2014/025074, dated Sep. 15, 2015.

PCT International Search Report, PCT/US2014/025074, dated Jul. 28, 2014.

(56) References Cited

OTHER PUBLICATIONS

European Search Report for application 14770848.1 dated Sep. 27, 2017.

* cited by examiner

REACTORS, SYSTEMS, AND METHODS FOR FORMING SOLID PRODUCTS

PRIORITY CLAIM

This application claims the benefit of the filing date of U.S. Provisional Patent Application Ser. No. 61/790,102, filed Mar. 15, 2013, for "Reactors, Systems, and Methods for Forming Solid Products," the contents of which are incorporated herein by this reference.

TECHNICAL FIELD

Embodiments of the present disclosure relate to reactors, systems, and methods for forming solid products from a reactive gas in the presence of a catalyst. For example, methods disclosed herein may be used to form various allotropes and morphologies of solid carbon, including carbon nanotubes.

BACKGROUND

U.S. Patent Publication No. 2012/0034150 A1, published Feb. 9, 2012, the disclosure of which is hereby incorporated herein in its entirety by this reference, discloses background information hereto.

Continuous production of solid products from reactive gases typically entails reacting the reactive gases in the presence of a catalyst in such a way that the solid products are elutriated from the surface of the catalyst. The solid products are thus swept away from the catalyst and subsequently harvested in a suitable process or series of processes for removing particulates from reaction tail-gases. Reactors conventionally used for such continuous solid production include fluidized-bed reactors, fixed bed reactors, pulsed bed reactors, shaft kilns, etc. Particulate removal devices typically include cyclones, bag houses, electrostatic precipitators, scrubbers, etc.

The capital and operating expenses of the equipment to separate solid products from tail gases are significant. Worker and environmental exposure associated with maintenance of such equipment are also of concern. In particular, small solid materials such as nanoparticles, fibers, and other morphologies, are very difficult to economically separate from gases because they may be so small that they have high blow-by rates in cyclones, tend to penetrate and plug fabrics in bag filters, and have electrical conductivities making them unsuitable for removal in scrubbers or precipitators.

Efficiently separating solid particles from process gas streams is important for both the economics of a process and for environmental safety of the process. In processes in which the solid product is salable, increasing recovery may be desirable to maximize yield, revenue, or profits. The cost of recovery can be significant in both capital and operating costs. Furthermore, regulatory, safety, or other considerations may dictate limiting or minimizing environmental and worker exposure to industrial dusts and nanoparticles.

DISCLOSURE

In some embodiments of the disclosure, a reactor includes a vessel having at least one outer wall, a gas inlet configured to deliver a reactive gas into the vessel, a solid product outlet configured to deliver a solid product from the vessel, a catalyst support configured to at least partially retain a catalyst material and allow a tail gas to pass therethrough, and a gas outlet configured to deliver the tail gas from the catalyst support through the outer wall of the vessel. The gas inlet is in fluid communication with the solid outlet. The solid outlet is separate and distinct from the gas outlet. The solid product flows counter to the reactive gas flow, and the solid product discharge from the reactor is separate and distinct from the tail gas outlet.

In other embodiments, a system for producing a solid product includes a reactor, a compressor configured to circulate a reactive gas through the reactor, and a heater configured to heat the reactive gas to a reaction temperature. The system also includes a make-up reactive gas inlet configured to deliver reactive gas to the system to maintain a constant mass of reactive gas in the system and a solids discharge means for removing the solid product from the solid outlet of the reactor.

In yet other embodiments, a reactor includes an internal catalyst container within which the catalyst is retained. The catalyst container is in fluid communication with the reactor vessel so that as the solid product grows on the surface of the catalyst, the product can be removed from the catalyst container and flow through the reactor to a solid product removal system. The removal of the solid product from the internal catalyst container may be, for example, by means of reactive gases blowing the solid product off of the surface of the internal catalyst container by means of a suitably configured diffuser. Options for the catalyst container include a mechanism to replenish and remove catalyst as required and a mechanism to introduce steam or other reactants into the catalyst bed to remove accumulated solid product by regasifying the solid product.

Methods of forming solid products include providing a catalyst material in a vessel having at least one outer wall and a porous catalyst support, delivering a reactive gas to the vessel, reacting the reactive gas in the presence of the catalyst to form a solid product and a tail gas in the vessel, passing the tail gas through at least a portion of the catalyst material to separate the solid product from the tail gas, and removing the solid product from the vessel.

A reactor may be coupled with heating and cooling mechanisms to control the temperature of the reactor. For example, a reactor may be configured such that products and excess reactant are recycled through a cooling mechanism to condense water vapor. The products and/or excess reactant may then be reheated and recycled through the reactor. By removing some of the water vapor in the recycled gases, the morphology of solid carbon formed may be controlled. Changing the partial pressure of water vapor changes the carbon activity of a mixture. The reactor may also be coupled to a carbon collector in which water and unreacted reactants are separated from the carbon products. The separated carbon products are collected and removed from the system.

In certain embodiments hereof, the partial pressure of water in the reaction is regulated by various means, including recycling and condensation of water, to influence, for example, the structure or other aspects of the composition of carbon products produced. The partial pressure of water appears to assist in obtaining certain desirable carbon allotropes.

In certain embodiments, a broad range of inexpensive and readily-available catalysts, including steel-based catalysts, are described, without the need for activation of the catalyst before it is used in a reaction. Iron alloys, including steel, may contain various allotropes of iron, including alpha-iron (austenite), gamma-iron, and delta-iron. In some embodiments, reactions disclosed herein advantageously utilize an iron-based catalyst, wherein the iron is not in an alpha phase.

In certain embodiments, a stainless steel containing iron primarily in the austenitic phase is used as a catalyst.

Catalysts, including an iron-based catalyst (e.g., steel, steel wool), may be used without a need for an additional solid support. In certain embodiments, reactions disclosed herein proceed without the need for a ceramic or metallic support for the catalyst. Omitting a solid support may simplify the setup of the reactor and reduce costs.

MODE(S) FOR CARRYING OUT THE INVENTION

Figure 1:
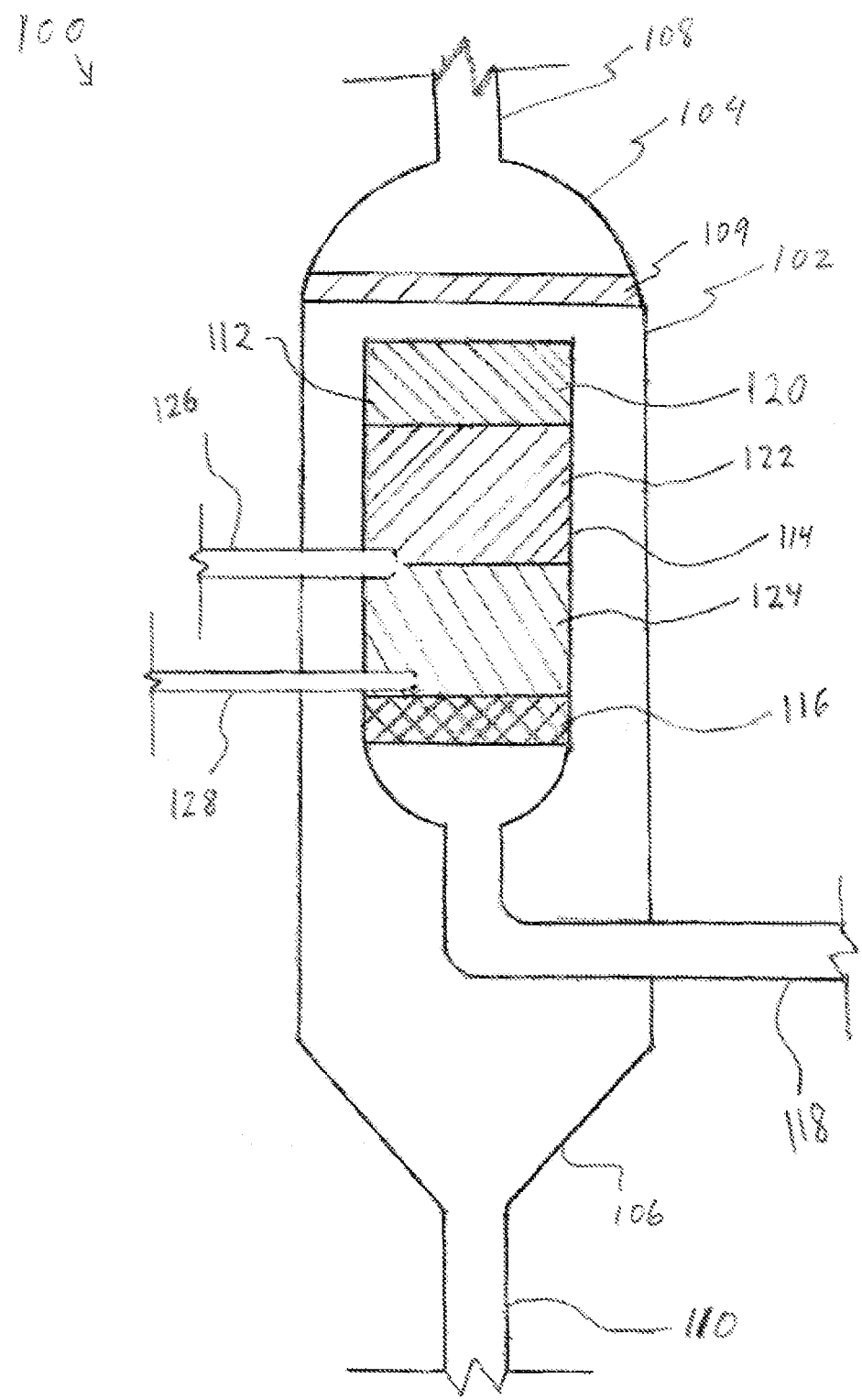
FIG. 1 is a simplified schematic illustrating an embodiment of a reactor.

The present disclosure describes a reactor, system, and method for the production of solid products from reactive gases. Such solid products are formed from the reactive gases in contact with a catalyst material. In operation, the reactive gas flows across the bed of catalyst material in such a way that solid products form on the leading edge of the bed (i.e., the exposed surface). The volumetric expansion of solid products (i.e., due to the formation of such solid products) causes the solid products to flow out of the reactor. Downstream portions of the bed of catalyst material may optionally be configured to filter or react with components of the reactive gases to minimize the entrainment of solid product in the tail gases leaving the reactor.

As use herein, the term "solid product" means and includes any dusty, friable, powdery, sandy, chunky, or porous material that may occur as solid granules or agglomerations of solid material with or without voids. Such materials may include a wide range of chemistries and morphologies and are distinguished by the presence of solid phase material in the product. Such materials specifically include nanoparticles of various chemistries and morphologies including carbon nanotubes, carbon nanofibers, and nanodiamonds.

As used herein, the terms "catalyst" and "catalyst material" mean and include a material formulated to promote one or more reactions, resulting in the formation of a solid product. A portion of a catalyst may be removed from a surrounding portion of the catalyst during the reaction and contained in or adhered to the solid product. Thus, some of the catalyst may be physically removed during the reaction, and the catalyst may be continually replenished. The portion of the catalyst may not therefore be considered a catalyst in the classical sense, but is nonetheless referred to herein and in the art as a "catalyst" if the reaction is not believed to alter chemical bonds of the material forming the catalyst. Particularly useful catalysts for forming solid products include, for example, iron, nickel, cobalt, etc., or other Group 2 through Group 15 elements (e.g., Group 5 through Group 10 elements) and alloys and mixtures thereof. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. In some embodiments, commercially available metals are used without special preparation. Catalysts may be granular, fibrous, particulate, zeolite, or in any other form compatible with the reactor design and catalyst handling methods disclosed herein. For example, catalyst may include materials similar to steel sand blasting grit, steel wool, chopped steel wool, and similar materials.

FIG. 1 is a simplified schematic illustrating an embodiment of a reactor 100. The reactor 100 includes an outer vessel 102 having a hemispherical head 104 and a conical base 106. The hemispherical head 104 includes an inlet 108 for a reactive gas. The conical base 106 has a cross section that narrows toward a product discharge 110 through which a solid product and, in some embodiments, a portion of the reactive gases may flow when the reactor 100 is in operation. The reactive gases may include, for example, a mixture of a carbon oxide (e.g., carbon monoxide, carbon dioxide, or both) and a reducing agent (e.g., hydrogen, methane, a hydrocarbon gas, an alcohol, etc.).

The outer vessel 102 may be made of any suitable materials, and the materials may be selected based on the expected service conditions of the reactor 100. For example, the outer vessel 102 may be a ceramic-lined steel vessel. The reactor 100 may be configured to be operated in an orientation in which the bottom is a conical base 106, as illustrated in FIG. 1. In other embodiments, the bottom of the outer vessel 102 may include any other shape configured for collecting and removing the solid product formed in the reactor 100 to the product discharge 110. Though the reactor 100 shown in FIG. 1 includes an outer vessel 102 having a hemispherical head 104 and a conical base 106, the outer vessel 102 may include heads or ends having any appropriate shape to accommodate solid product reactions. Various shapes are commonly used in industry for the heads and bases of reaction vessels and such shapes may be selected based on the flow of materials, reaction temperatures and pressures, ease of manufacturing and maintenance, etc.

The inlet 108 is configured to receive reactive gas. The flow of reactive gas may be directed by features of the inlet 108, the hemispherical head 104, or the outer vessel 102. When the reactor 100 is in operation, reactive gas enters the outer vessel 102 through the inlet 108 for the reactive gas. The reactor 100 may optionally include an inlet baffle 109 configured to direct the flow of reactive gas, as described in more detail below. Though FIG. 1 illustrates an inlet 108 attached to a hemispherical head 104, the reactor 100 may include a head having any shape, and the inlet 108 may be configured at various locations and angles other than axially on hemispherical head 104. The inlet 108 may be configured as a side inlet or tangential inlet to outer vessel 102. The inlet 108 may be configured to extend into the vessel and so that reactive gas flowing into the reactor blows the solid product off of the surface of the inner chamber 112.

The inlet baffle 109, if present, may be designed to blow the solid products forming in reactor 100 off of a surface of catalyst material and toward the product discharge 110. In operation of the reactor 100, reactive gas flows into the outer vessel 102 through the inlet 108, through the inlet baffle 109, to an inner chamber 112, as described in more detail below. The solid products formed on the catalyst in the inner chamber 112 are removed from inner chamber 112, passed through the area between inner chamber 112 and outer vessel 102, and collected at the bottom of the outer vessel 102. The solid products flow through the product discharge 110 and are removed from the reactor 100 by a solids removal system, such as described below and shown in FIG. 6. The inlet baffle 109 may have any suitable shape to direct reactive gas within the reactor 100. Some embodiments of an inlet baffle 109 are illustrated in FIGS. 2A through 3B and described below.

The solid product is typically not tightly bound to the catalyst contained in the inner chamber 112, and the solid product is typically much less dense than the catalyst. As the reactive gases contact the catalyst in the inner chamber 112, the solid product is formed on the surface of the catalyst. As additional solid product is formed, the solid product is released from the surface of the catalyst, forming a light powder as a solid product surrounding the catalyst. Because of the density difference and the continuing flow of the reactive gases through the inner chamber 112, the catalyst continually settles in the inner chamber 112, and the solid product rises to the surface of the inner chamber 112, where it is removed from the surface of the inner chamber 112. The solid products are removed from the inner chamber 112 by blowing off of the surface of the inner chamber 112 by reactive gases flowing through the baffle 109, by solid products piling and slumping off of the surface of the inner chamber 112, or by a combination thereof.

The inlet baffle 109 may be positioned within the reactor 100 above the inlet to the inner chamber 112 and with sufficient clearance to allow for product formation and piling on the surface of catalyst material disposed in the inner chamber 112. The inlet baffle 109 may be placed such that at normal operating conditions, the reactive gases have a velocity sufficient to sweep the solid product from the surface of the inner chamber 112, but a velocity below the entrainment velocity of the catalyst material so that the catalyst material stays in the inner chamber 112. In other words, the flow of the reactive gases is slow enough that the catalyst material (except for portions bound up in solid products) is not entrained in the reactive gases. In other embodiments, it may be desirable to continuously sweep a surface layer of catalyst material out of the inner chamber 112 with the solid product. The inner chamber 112 may be designed with a volume above the catalyst surface for the accumulation of solid reaction products prior to such products exiting the inner chamber 112. This volume above the catalyst surface for the accumulation of solid reaction products may be designed to assure that catalyst particles settle out of the solid reaction products and the resulting solid reaction products are substantially free of unreacted catalyst.

Figure 2A:
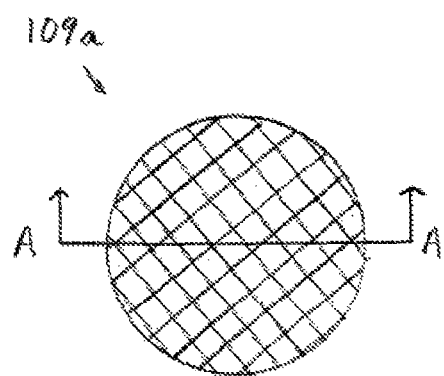
FIG. 2A is a simplified schematic illustrating an embodiment of an inlet baffle that may be used in the reactor of FIG. 1.
Figure 2B:
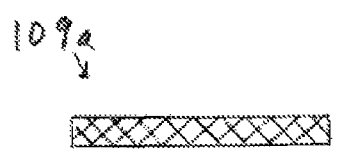
FIG. 2B is a cross-sectional view of the inlet baffle of FIG. 2A at the section line A-A.

The inlet baffle 109 is used to direct the reactive gases so that they act as an air knife to blow at least a portion of the solid reaction products from the top of the inner chamber 112 without entraining catalyst located in the inner chamber 112. FIGS. 2A and 2B illustrate one embodiment of an inlet baffle 109a, such as the inlet baffle 109 shown in FIG. 1, and are included by way of illustration and not as limitation. In particular, FIG. 2A is a top view of the inlet baffle 109a, and FIG. 2B is a cross-sectional view of the inlet baffle 109a at the section line A-A. The inlet baffle 109a is a porous medium through which reactive gases can flow. A porous inlet baffle 109a may provide a more-uniform gas flow across a cross section of the reactor 100 than the inlet 108 alone, promote mixing of the reactive gases, and may limit the depth of solid product accumulation on the surface of the inner chamber 112 and evenly blow solid product off of the surface of the catalyst material in the inner chamber 112. The porous inlet baffle 109a may include a material such as a sintered ceramic, a sintered metal, or any other material suitable for use in expected operating conditions in the reactor 100. The inlet baffle 109a typically has a constant thickness, as illustrated in FIG. 2B. However, the inlet baffle 109a may have a thickness that varies across a cross section thereof. The size of the inlet baffle 109a may be selected to correspond to an inside dimension (e.g., a diameter) of the outer vessel 102 or to a dimension of the inner chamber 112 (e.g., an inner or outer diameter). In embodiments in which the size of the inlet baffle 109a corresponds to a dimension of the inner chamber 112, the inlet baffle 109a may be mounted in a solid material that restricts the flow of reactant gases. In some embodiments, a solid flow-restricting plate on the top, bottom, or both surfaces of the inlet baffle 109a may limit flow of reactive gases to selected portions of the reactor 100.

Figure 3A:
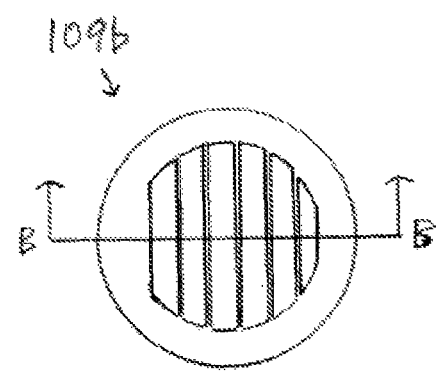
FIG. 3A is a simplified schematic illustrating another embodiment of an inlet baffle that may be used in the reactor of FIG. 1.
Figure 3B:
FIG. 3B is a cross-sectional view of the inlet baffle of FIG. 3A at the section line B-B.

FIGS. 3A and 3B illustrate another embodiment of an inlet baffle 109b, such as the inlet baffle 109 shown in FIG. 1, and are included by way of illustration and not as limitation. In particular, FIG. 3A is a top view of the inlet baffle 109b, and FIG. 3B is a cross-sectional view of the inlet baffle 109b at the section line B-B. The inlet baffle 109b is a perforated baffle configured to direct reactive gas flow, such as to collimate the flow of reactive gas. The inlet baffle 109b typically has channels formed therein that are angled or otherwise formed so that they constitute flow vanes to direct the flow of the reactive gases across the surface of the catalyst material. The inlet baffle 109b may define openings that are aligned in the same direction with one another, as shown in FIG. 3B. Alternatively, some openings may be aligned in directions different from other openings. The inlet baffle 109b may include a material such as a ceramic, a metal, or any other material suitable for expected operating conditions in the reactor 100.

The inlet baffle 109b may be configured to direct reactive gas flow to blow solid product off of the surface of the catalyst chamber in a controlled manner to level the solid product on the surface of the catalyst material in the inner chamber 112. In operation, the flow of reactive gases may therefore blow the solid products toward the product discharge 110. FIG. 3B shows that the inlet baffle 109b may have a series or array of flow vanes. In some embodiments, the inlet baffle 109b has perforations located such that the flow of reactive gases is directed across the surface of the inlet area of the catalyst chamber. The inlet baffle 109b may have a complex arrangement of channels formed in the material so that the solid material is blown as desired off of the surface of the catalyst material in the inner chamber 112 toward the product discharge 110.

Figure 4:
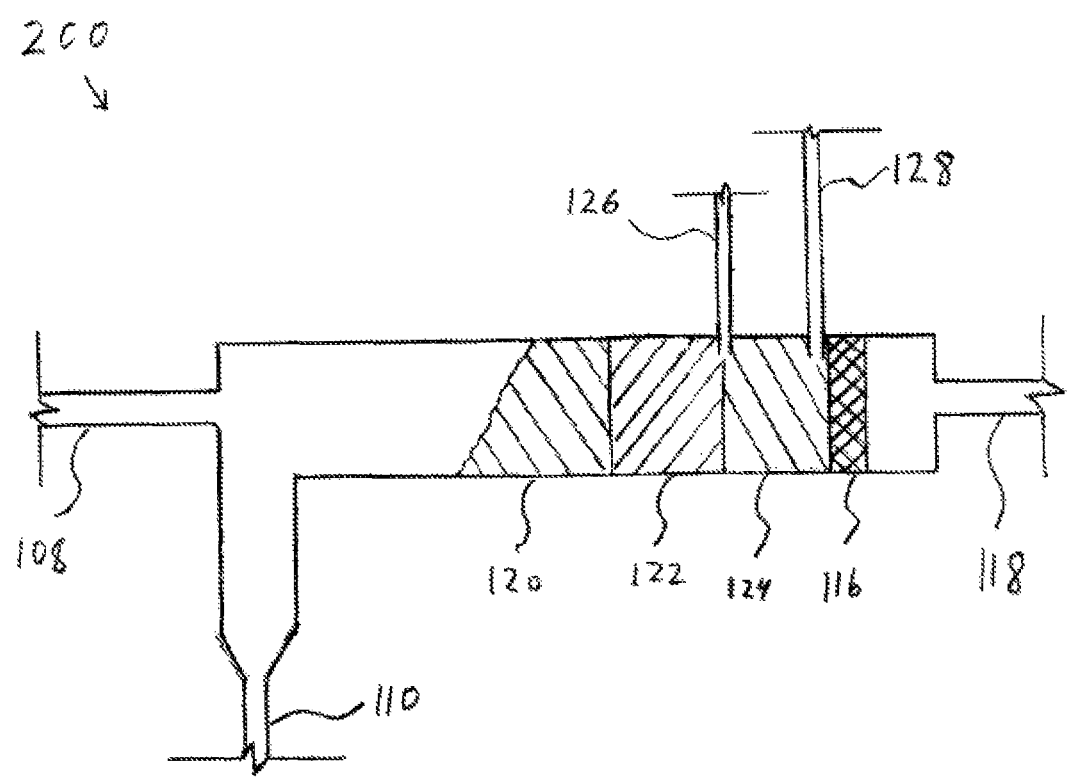
FIG. 4 is a simplified schematic illustrating another embodiment of a reactor.

The inner chamber 112, as shown in FIG. 1, may be a distinct body within the reactor 100 suitable for vertical reactor orientation and operation. Alternatively, the inner chamber 112 may be omitted for horizontal reactor orientation and operation, as shown in FIG. 4 and described below. The inner chamber 112 has a wall 114 configured to at least partially retain a catalyst material. The wall 114 may be cylindrical or any other shape. For example, the wall 114 may define an interior volume in the shape of a rectangular prism. The inner chamber 112 includes a support 116 also configured to at least partially retain the catalyst material. The support 116 is configured to limit or prevent the transfer of catalyst material from the inner chamber 112 to a tail gas exit 118. That is, the support 116 allows gases to pass through, but may prevent solids or liquids above a selected particle size from passing through. The support 116 may be porous and may be, for example, a sintered ceramic or metal disk or a packing such as quartz fiber. The support 116 may be selected so that the catalyst particles will be retained; for example if an 80-mesh catalyst particle (i.e., a particle that passes through a screen having 80 openings per linear inch (32 openings per linear cm)) is used, the support 116 may be selected so that the pore size is significantly less than 80 mesh, such as a 120 mesh stainless steel fabric. The support 116 may further be selected so that the product particles are retained, which may require a substantially smaller pore size than that required to retain the catalyst particles.

Catalyst material suitable for catalyzing one or more reactions to form a solid product is retained in the inner chamber 112 by the wall 114 and the support 116. In some embodiments, the catalyst is formulated to serve at least two functions: to catalyze reactions and to filter solid reaction product materials from tail gases (i.e., gases remaining after reaction to form the solid product). For example, the catalyst material in sections 120, 122, 124 of the inner chamber 112 may variously catalyze the reaction of reactive gases to form solid products, filter the solid products from tail gases, and/or convert solid products that break through the filter section back into gaseous reactants for removal with the tail gases.

In some embodiments, catalyst material in the first, reaction section 120 catalyzes the reaction of reactive gases to form solid products, catalyst material in the second, filter section 122 filters the solid products, and reactants added through the optional reactant inlet 126, in the third, regasification section 124, convert any solid particles not filtered in the filter section 122 back into reaction gases. Though shown in FIG. 1 as distinct sections of the inner chamber 112, the inner chamber 112 may be continuous, having no discernible boundaries between such sections 120, 122, 124. Furthermore, sections 120, 122, 124 or portions thereof may serve multiple functions. For example, when the reactor 100 is in operation, reactive gases may react in the presence of the catalyst material in the reaction section 120, and solid products may be filtered from downward flowing gases beginning in the reaction section 120 and continuing to some degree in the filter section 122.

Catalyst may be fed to the inner chamber as needed to replace catalyst material entrained in the solid carbon product or otherwise removed from the inner chamber 112, or at a rate sufficient to assure that the catalyst bed flows counter to the reaction gas flow at a rate sufficient to eliminate solid carbon particles flowing in the reaction gas passing all the way through the catalyst bed.

In some embodiments, continuously or periodically replenishing the catalyst through catalyst inlet or removal means 128 located at or near the surface of the support 116 assures that the catalyst bed moves as plug flow, counter-current to the flow of the reactive gases through the catalyst bed. In such embodiments, the flow of the catalyst is sufficient to assure that solid reaction products do not break through the catalyst bed and plug the support 116 or remain in the tail gas stream. In such embodiments, the catalyst bed may act as a filter to remove solid reaction products from the gas stream. In such cases, the regasification section 124 and the reactant inlet 126 may be omitted. The catalyst bed may be designed with a depth to provide at least a reaction section 120 and a filter section 122.

Catalyst material may be entrained in the solid product and removed from the inner chamber 112 and discharged with the solid product from the reactor 100. Subsequent processing of the solid product to remove at least a portion of the catalyst material may be performed to assure product quality.

The inner chamber 112 may be filled with catalyst material, such as particulate material or packed media. The amount of catalyst material in the inner chamber 112 may be selected such that the depth of the catalyst material is sufficient to prohibit breakthrough or plugging of the catalyst bed in the filter section 122 by the solid product produced in the reaction section 120. That is, the depth of the catalyst material may be selected such that, in operation of the reactor 100, the filter section 122 adequately filters the solid product formed in the reaction section 120.

The reactor 100 may be configured such that catalyst material is introduced into the inner chamber 112 as a batch (i.e., before reactive gases flow into the reactor 100) and periodically replenished as needed. Alternatively the catalyst material may be introduced continuously into the inner chamber 112 via a catalyst inlet or removal means 128. In either case, the catalyst material may be provided in a form that filters the solid products formed by reaction of the reactive gases in the presence of the catalyst material. For example, catalyst material in the form of fine particles (e.g., steel grit or steel shot) or fibrous materials (e.g., steel wool or chopped steel wool) may be suitable for both catalyzing formation of solid products and filtering the solid products from remaining tail gases. The form and amount of the catalyst material may be selected such that the support 116 remains porous (i.e., the support 116 does not become blocked or plugged by the solid products during operation of the reactor 100).

The reactor 100, as shown in FIG. 1, may include a catalyst inlet or removal means 128 for adding catalyst material to the inner chamber 112. The catalyst may be transferred from a catalyst storage device (e.g., a tank, a hopper, etc.) through the catalyst inlet or removal means 128 to the inner chamber 112 at or near an upstream surface of the support 116 or at any selected location within the inner chamber 112. In the embodiment shown in FIG. 1, the catalyst inlet or removal means 128 is configured to deliver catalyst material on the support 116 at the bottom of the regasification section 124 of the inner chamber 112. The catalyst inlet or removal means 128 may include a diffuser so that the flow of catalyst material does not erode the support 116 or the wall 114.

For example, an impact plate may be disposed on the surface of the support 116, at the point of catalyst feed, to protect the support 116 from erosion and to distribute the catalyst material. Suitable means for conveying the catalyst material include, for example, mechanical conveyance such as a screw feeder, or pneumatic conveyance. The catalyst inlet or removal means 128 may be configured such that conveyance of the catalyst material does not unduly contaminate the reactive gas in the reactor 100. For example, the catalyst inlet or removal means 128 may include a means for purging the catalyst inlet or removal means 128 with reactive gas, an inert gas, or a compatible gas; a pneumatic conveyance using reactive gas or a constituent thereof; or a sealed lock hopper for the catalyst store to enable vacuum or purging of the catalyst material prior to conveying the catalyst material through the catalyst inlet or removal means 128 into the reactor 100.

In operation of the reactor 100, catalyst material addition may be continuous or periodic. As additional catalyst material is added through the catalyst inlet or removal means 128, the added catalyst material pushes catalyst material up in the inner chamber 112, counter to the flow of the reactive gas. This counter-flow arrangement allows continuous refresh of the catalyst material throughout the inner chamber 112. In some cases, it may be desirable to add the catalyst material at some other point in the inner chamber 112, such as at the surface of the catalyst bed. Suitable arrangements will readily occur to a person having ordinary skill in the art for various solid products.

For some reactions, the consumption of catalyst material is slow enough that periodic addition is sufficient and operationally simpler than continuous addition of catalyst material. In such embodiments, the catalyst inlet or removal means 128 may be omitted or may include a valve that can be closed while the reactor 100 is in operation. If the catalyst inlet or removal means 128 is omitted, catalyst material may be added to the inner chamber 112 by opening the reactor 100 during periods of time between reactor operations.

The catalyst inlet or removal means 128 may be a conduit or pipe configured such that catalyst material enters the reactor 100, passes through the outer vessel 102 without mixing with gases or solids therein, enters the inner chamber 112, and disperses within the inner chamber 112. The flow of catalyst material may be dictated by particular design parameters. For example, the catalyst inlet or removal means 128 may be configured such that heat may be transferred from reactive gases or solid products to the catalyst material as the catalyst material is added to the inner chamber 112. Entry points and methods for routing the catalyst inlet or removal means 128 may be selected based upon process conditions and the principles disclosed herein.

In some embodiments, the catalyst inlet or removal means 128 may be routed through the bottom of the reactor up and through the side of the inner chamber 112. In this configuration, the catalyst material may be heated by recovering some heat from solid products falling toward the product discharge 110. Cooling of the solid product in the reactor 100 by transferring heat to the catalyst material in the catalyst inlet or removal means 128 may lower the cooling load on the product discharge 110. Many suitable variations on exactly how and where the catalyst inlet or removal means 128 enters the reactor 100, how the catalyst inlet or removal means 128 is routed within the reactor 100, and how and where the catalyst inlet or removal means 128 enters the inner chamber 112, may be selected based on various design parameters.

The catalyst inlet or removal means 128 may be used to remove catalyst from the inner chamber 112, such as by using the reactive gas pressure or an inert gas flow to entrain and flow the catalyst out when the catalyst inlet or removal means 128 is connected to a lower pressure receiving vessel or catalyst capture system. In another variation, the catalyst inlet or removal means 128 may be configured so that during removal operations, gas flows through the catalyst inlet or removal means 128 with sufficient volumetric flow that the gas blows the catalyst out of inner chamber 112 and flows to the product discharge 110 to be removed from the reactor 100 by a solids removal system. Many variations in implementation of the catalyst inlet or removal means 128 may be suitable to specific catalysts and reactor designs.

The reactor 100, as shown in FIG. 1, optionally includes a reactant inlet 126 for adding a suitable reactant to convert any solid product that may break through the filtration section back into gaseous reactants (e.g., steam, optionally supplied as water or water vapor, may be used to convert solid carbon product back into carbon monoxide and hydrogen) to the inner chamber 112. The reactant may be liquid or gaseous and may be transferred from an external supply through the reactant inlet 126 to the inner chamber 112 at or near an upstream surface of the support 116 or at any selected location within the inner chamber 112. In the embodiment shown in FIG. 1, the reactant inlet 126 is configured to deliver reactant between the filter section 122 and the regasification section 124 of the inner chamber 112. The reactant inlet 126 may include a diffuser so that the flow of reactant is evenly distributed through the cross section of the inner chamber 112.

When reactant is introduced to the reactor 100 through the reactant inlet 126, the regasification section 124 of the inner chamber 112 below the reactant inlet 126 may operate at conditions that promote a reaction between the reactant and the solid products within the regasification section 124 of the inner chamber 112 that pass through the filter section 122 of the inner chamber 112. For example, water introduced as a reactant in a solid carbon production reactor (e.g., a reactor in which carbon dioxide and hydrogen react to make solid carbon product) may oxidize any solid carbon products present in the regasification section 124 through the water-gas reaction ($C_{(s)}+H_2O \Leftrightarrow CO+H_2$). Furthermore, water may react with one or more reactants of the reactive gas or products thereof (e.g., under some conditions, carbon monoxide, which may be present in the reactive gas, forms carbon dioxide in the water-gas shift reaction: $CO_{(g)}+H_2O_{(g)} \rightarrow CO_{2(g)}+H_{2(g)}$. Thus, addition of water to the reactor 100 through the reactant inlet 126 may have benefits of oxidizing the reactive materials to form gaseous products that may be recycled. For example, reaction of water with carbon monoxide may form carbon dioxide, reducing the potential for metal dusting in downstream equipment. Because a pressure differential may exist across the inner chamber 112, any added reactant not reacted within the regasification section 124 may tend to flow from the point of addition out through the tail gas exit 118.

For example, during operation of the reactor 100 to produce solid carbon product, water (as the reactant) may be added continuously or periodically. In general, it is operationally simpler to continuously inject water at a predetermined rate using one or more water pumps. Water may be pumped to various pressures economically, and the concentration of water in the inner chamber 112 may be controlled by controlling flow of water through pumps.

Because some catalytic reactions forming solid products require or generate relatively high temperatures (e.g., greater than 500° C.), water, if introduced as liquid, generally vaporizes as it travels through the reactant inlet 126. The reactant inlet 126 typically includes a suitable distribution system to allow for distribution of the water throughout a cross section of the inner chamber 112 (e.g., relatively uniform across a cross section of the inner chamber 112). Water may be processed before introduction to the reactor 100, such as by filtration, distillation, deionization, etc. The injection of water through the reactant inlet 126 may have additional benefits, such as cooling the tail gases prior to discharge and raising the water vapor pressure in the tail gases above the oxidation point of metals in the downstream piping and vessels (which may reduce or eliminate metal dusting downstream).

The reactant inlet 126 may enter the reactor 100 at various different points, such as through a cylindrical wall of the outer vessel 102, through the hemispherical head 104, or through the conical base 106. For example, the reactant inlet 126 may be configured such that reactant enters the reactor 100, passes through the outer vessel 102, enters the inner chamber 112, and disperses within the inner chamber 112. The flow of reactant may be dictated by particular design parameters. For example, the reactant inlet 126 may be configured such that heat may be transferred from reactive gases to the reactant as the reactant is added to the inner chamber 112. Many suitable entry points and methods for routing the reactant inlet 126 will readily occur to the skilled practitioner based upon the principles disclosed herein.

In some embodiments, the reactant inlet 126 may be routed through the bottom of the reactor up and through the side of the inner chamber 112. In this configuration, the reactant may be heated by solid product flowing toward the product discharge 110. Cooling of the solid product in the reactor 100 by transferring heat to the reactant in the reactant inlet 126 may lower the cooling load on the product discharge 110 and associated equipment. Many suitable variations on exactly how and where the reactant inlet 126 enters the reactor 100, how the reactant inlet 126 is routed within the reactor 100, and how and where the reactant inlet 126 enters the inner chamber 112, may be selected based on various design parameters.

The reactor 100 shown in FIG. 1 is suitable for vertical installation (i.e., in the orientation shown in FIG. 1). In operation, gases flow into the reactor 100 through the inlet 108, through the inner chamber 112, and to the tail gas exit 118. Solid (i.e., solid reaction product) forms in the first section 120 of the inner chamber 112 as the reactive gases come into contact with the leading edge of the catalyst material. The reactive gases may have a suitable residence time in the reactor 100 to allow for the completion of the growth phase of the solid product. The solid volumetric expansion (i.e., due to the conversion of gases to solids) pushes solid product over the wall 114 of the inner chamber 112. Solid product thus flows to the product discharge 110, and may be removed from the reactor 100 by a solids removal system, as described below and shown in FIG. 6. In some embodiments, the inlet 108 may be configured such that entering reactive gases blow the solid product off of the surface of the catalyst material in the inner chamber 112 so that the solid product settles within the annulus or gap between the inner chamber 112 and outer wall of the outer vessel 102, flowing to the product discharge 110. Various configurations of nozzles, channels, or other flow-directing devices are suitable for providing the gases from the inlet 108 within the reactor 100 so that the gas flow blows the solid product off of the surface of the catalyst material, without entraining catalyst material in the gas flow. Such devices are generally known in the art and not described in detail herein. FIGS. 2A & 2B, and FIGS. 3A & 3B, described above, are included by way of illustration and not as limitation of the types of gas knife designs that can be used to blow the reaction products off the top of the inner chamber 112.

Though FIG. 1 shows the tail gas exit 118 as exiting the bottom of the inner chamber 112 and then through the wall of the reactor 100, this is by way of illustration only; other configurations may achieve the same effect. For example, the tail gas exit 118 can be configured so that the gas flows through the inner chamber 112 including the support 116 and then through a tail gas exit pipe flowing gases that have passed through support 116 up through the inner chamber 112 and form there out of the reactor 100. Similarly, the routing of the reactant inlet 126 and the catalyst inlet or removal means 128 are by way of illustration and not as limitation.

The flow rate of reactive gas through the inner chamber 112 may be selected such that a superficial velocity of the reactive gas through the inner chamber 112 exceeds the diffusion rate of the reaction products in the tail gas mixture. Below this velocity, the reactive may not sweep the gaseous reaction products (e.g., water, $CO_2$, $CH_4$) out of the catalyst in the reaction section 120, which tends to inhibit reaction rates, affect product quality, or both. Determining this superficial velocity for the particular combination of reactive gas mixture and catalyst provides the basis for sizing the inner chamber 112 to accommodate the design flow rate of the reactive gas.

FIG. 4 illustrates a reactor 200 without a separate inner chamber for catalyst material. This reactor configuration is suitable for horizontal operation or operation at any angle such that the catalyst is retained in the reactor 200 by the force of gravity. In the reactor 200, an inlet 108 delivers reactive gas into the reactor 200, wherein the reactive gas flows toward a tail gas exit 118. A support 116 is located downstream of a catalyst inlet or removal means 128 and a reactant inlet 126. The catalyst material in sections 120, 122, 124 of the reactor 200 may variously catalyze the reaction of reactive gases to form solid products, filter the solid products from tail gases, and/or scrub gaseous compounds from tail gases.

In operation of the reactor 200, catalyst material enters through the catalyst inlet or removal means 128 to form a counter-flowing packed bed of catalyst material, as discussed above with respect to FIG. 1. The reactant inlet 126 may continuously inject a reactant that reacts with solid reaction products entering the gasification section 124 to gasify the solid reaction products. For example, in embodiments producing solid carbon, the reactant may be water, as discussed above with respect to FIG. 1. Thus, the portion of the catalyst material downstream of the reactant inlet 126 may operate to promote a reaction between water and solid products, or between water and one or more gaseous species.

Upstream of the reactant inlet 126, as illustrated in the filter section 122, catalyst material typically acts as a filter to remove solid products from flowing to the tail gas exit 118, as discussed above with respect to FIG. 1. Downstream of the reactant inlet 126, catalyst material typically acts as a regasification section 124 for regasification of the solid product as it reacts with the reactant, as discussed above with respect to FIG. 1. The leading edge of the catalyst material reacts with the reactive gas stream to form solid products in the reaction section 122. As the solid products are formed, the volumetric expansion of solids (i.e., due to the conversion of gases to solids) pushes the solid products opposite the flow of the reactive gases toward a product discharge 110. Solid products flow to a solids removal system, as described below and shown in FIG. 6.

The reactor 200 shown in FIG. 4, as illustrated, may be appropriate for horizontal orientation. In other embodiments, the reactor 200 may be operated in a vertical orientation (i.e., with the reactive gas flowing vertically downward through the reactor 200), or in an angled orientation. The product discharge 110 may be modified to facilitate solid product flow out of the reactor 200 in the orientation selected for the reactor 200. When operated horizontally, the product discharge 110 is typically oriented downward so that gravity assists the solid products in dropping out of the portion of the reactor 200 in which the solid products form.

The leading edge of the catalyst material may be sloped, as shown, due to the force of gravity on the catalyst material.

Figure 5:
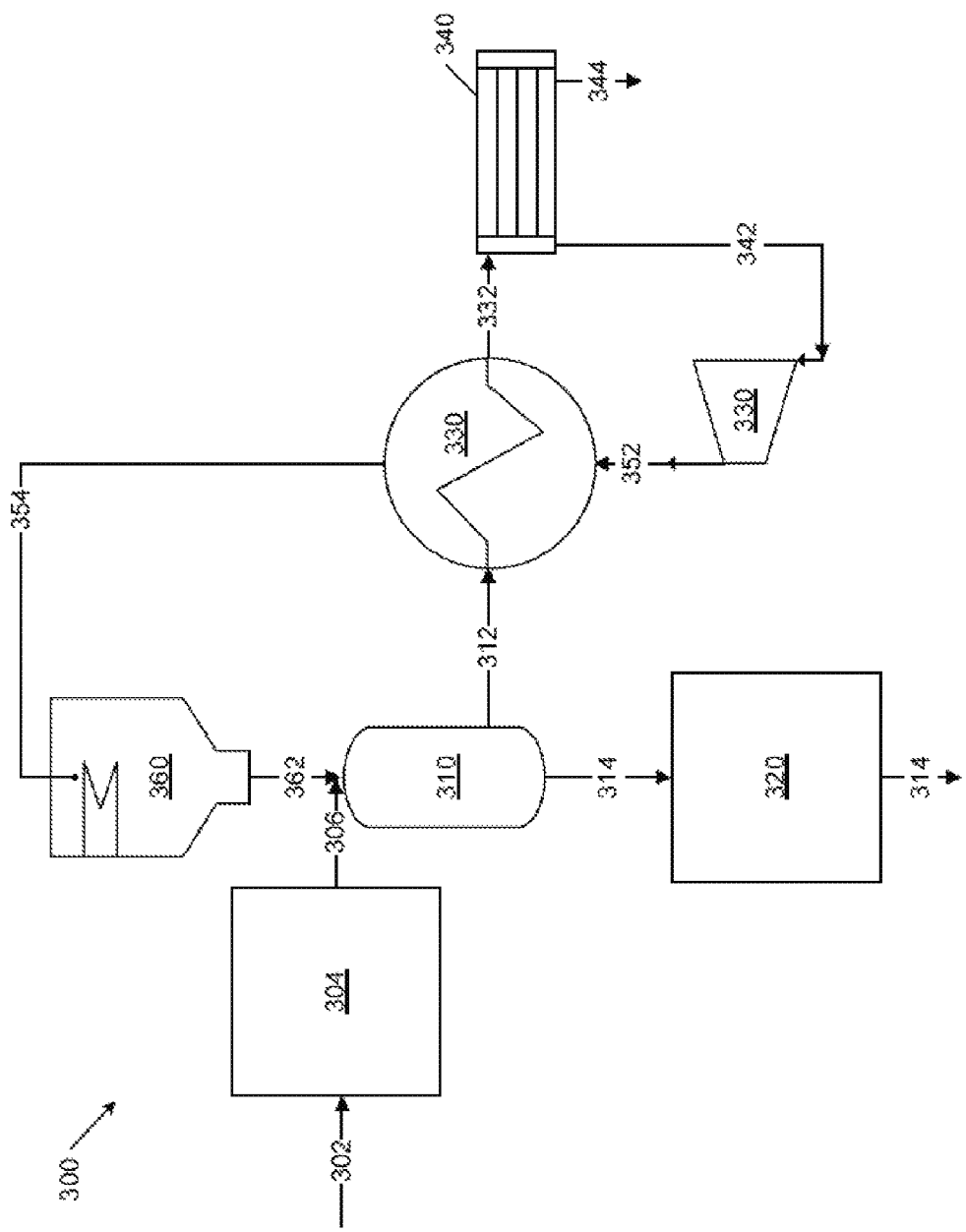
FIG. 5 is a simplified block flow diagram illustrating a system for the production of solid products using a reactor as described herein.

FIG. 5 illustrates a system 300 for forming solid products. The system 300 includes a preconditioner 304, which prepares one or more source gas 302 for processing, such as by heating or compressing the source gas 302 to form a makeup gas 306. This makeup gas 306 replaces gas consumed in the process either through conversion to solid product 314 or through venting. The makeup gas 306 enters the reactor 310, wherein at least a portion of the makeup gas 306 reacts to form a solid product 314 and water. The reactor 310 may be, for example, either of the reactors 100, 200 described above and shown in FIGS. 1 and 4, respectively. The solid product 314 flows to a solids removal device 320, through which the solid product 314 is removed from the system 300.

Tail gas 312 leaving the reactor 310, including water formed in the reaction, is transferred to a heat recovery system 330 (e.g., at least one heat exchanger), where the tail gas 312 is cooled. Cooled tail gas 332 flows from the heat recovery system 330 to a water removal system 340 (e.g., a condenser) to control the concentration of water. The resulting dried tail gas 342 enters a compressor 350 configured to recirculate gas through the system 300 and control pressure in the system 300. Condensate 344 separated in the water removal system 340 is removed from the system 300.

The heat recovery system 330 and the water removal system 340 may together be configured to provide a dried tail gas 342 suitable for the compressor 350 (e.g., cool enough and dry enough to meet inlet service specification of the compressor 350). The compressor 350 compresses the dried tail gas 342 to form a compressed tail gas 352. The compressed tail gas 352 enters the heat recovery system 330, wherein it is heated by the tail gas 312. The partially reheated tail gas 354 enters a heater 360 to obtain additional thermal energy and form recycle gas 362. The recycle gas 362 is combined with the makeup gas 306 to form the reactive gas mixture and enters the reactor 310 for further reaction to form the solid product 314 and water.

The makeup gas 306 may be mixed with the recycle gas 362 outside or inside the reactor 310. In certain embodiments, all or a portion of the makeup gas 306 may be mixed with any combination of the recycle gas 362, the partially reheated tail gas 354, the compressed tail gas 352, dried tail gas 342, cooled tail gas 332 or the tail gas 312. In some embodiments, one or more of the heat recovery system 330, the water removal system 340, or the compressor 350 may be omitted. That is, the tail gas 312 may be recycled without condensing water, recovering heat, or reheating the tail gas 312. The use of the heat recovery system 330, the water removal system 340, or the compressor 350 may be dictated by reaction conditions (e.g., whether water is added to or formed in the reactor 310, etc.). In some embodiments, the system 300 may include a vent to limit accumulation of inert gaseous material that does not react or other undesirable gaseous products (if any). The reactor 310 may optionally include a catalyst inlet or removal means 128, a reactant inlet 126 (see FIGS. 1 and 4), and a means for mixing the reactive gas 306 with the recycle gas 362.

The heat recovery system 330 is typically economical for relatively larger or high-temperature systems 300. The heat recovery system 330 may be designed such that metal surfaces wetted by the tail gas 312 are not significantly degraded by reaction with the tail gas 312. For example, when using reactive gas mixtures including carbon monoxide and hydrogen, the heat recovery system 330 may have two or more heat exchangers of different materials. Heat exchangers configured to be in contact with gases at temperatures in excess of the minimum reaction temperature for metal dusting may be formed of a material selected to minimize or eliminate metal dusting. Heat exchangers in contact with gases at temperatures below the minimum reaction temperature for metal dusting may be formed of a different (e.g., lower cost) material suitable or the application. In some embodiments, the composition of the materials used to form the heat recovery system 330 may be selected to be resistant to metal dusting under the service conditions. For example, the system 300 may be operated such that the tail gas 312 does not include species that cause metal dusting at the operating temperature of the heat recovery system 330.

The heater 360, which operates at higher temperatures and pressures than the heat recovery system 330, the water removal system 340, and the compressor 350, may be more prone to metal dusting than such other equipment. The materials of construction of the heater 360 may be selected to withstand or limit metal dusting (e.g., ceramic materials, high chromium equivalent alloys, alonized steels, KANTHAL™, etc.). Alternatively, a direct-fired combustion process, such as is commonly used in autothermal methane reforming or as disclosed in International Patent Publication No. WO 2014/011206, published Jan. 16, 2014, and titled "Methods and Systems for Forming Ammonia and Solid Carbon Products" or in U.S. Provisional Patent Application No. 61/789,887, filed Mar. 15, 2013, and titled "Direct Combustion Heating," may be used. Such a direct-fired combustion process is suitable to the production of solid carbon by means of the Bosch reaction and associated family of reactions as disclosed in U.S. Patent Publication No. 2012/0034150 A1, published Feb. 9, 2012, and titled "Method for Producing Solid Carbon by Reducing Carbon Oxides."

Figure 6:
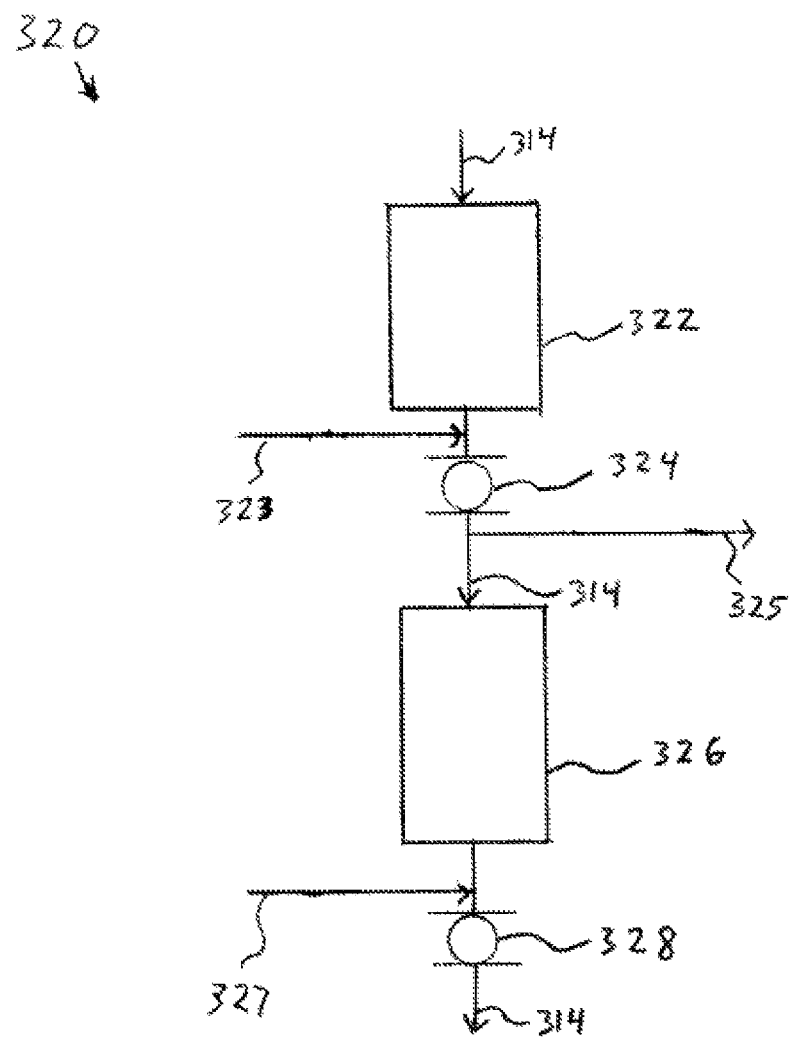
FIG. 6 is a simplified block flow diagram illustrating a solids removal device that may be used in conjunction with the reactors and systems described herein.

The solids removal device 320 may include a lock hopper arrangement configured for periodic discharge, as illustrated in FIG. 6. The solids removal device 320 may include at least one lock hopper 326 that is purged and cooled so that the solid product is made safe for discharge to a suitable material handling system. The solid product is periodically discharged through a discharge valve into the material handling system. Lock hoppers are known in the art, and many suitable variations for managing the discharge of the solid product from the reactor 310 may be employed by a person having ordinary skill in the art.

FIG. 6 shows a simplified drawing of a solids removal device 320 suitable for use with system 300 and reactors 100, 200, 310. The solids removal device 320 enables the safe discharge of the solid product 314 from the reactor 310 by cooling and purging the solid product 314 through one or more coolers 322 and a lock hopper 326. The solid product 314 flows from the reactor 310 into the cooler 322. Periodically, a lock hopper inlet valve 324 opens, permitting the solid product 314 to flow from the cooler 322 to a lock hopper 326, where the solid product 314 is purged of reactive gases and further cooled. The lock hopper inlet valve 324 opens to discharge product from the cooler 322 to the lock hopper 326, and closes prior to purging the lock hopper 326. Upon completion of purging and cooling of the solid product 314 in the lock hopper 326, a lock hopper discharge valve 328 opens to discharge the solid product 314 from the lock hopper 326 to a product handling system for removal from the system 300.

The cooler 322 may be continuously cooled by providing a heat transfer fluid (e.g. air, water, oil, glycol, etc., or a mixture thereof) or a portion of the reactive gas mixture to remove heat from the cooler 322. The heat transfer fluid may remove thermal energy from the solid product 314, and the heat may subsequently be removed from the heat transfer fluid and rejected by conventional means. If a portion of the reactive gas mixture is used, then the cooler 322 becomes part of the heat recovery system 330, and may recover at least part of the energy used in the system. In some embodiments, the cooler 322 is a jacketed vessel configured such that heat transfer fluid can flow within the jacket. The cooler 322 may include suitable controls for the flow of the heat transfer fluid, which are generally known in the art and not described in detail herein. For example, the cooler 322 may include one or more valves, backflow preventers, temperature sensors, temperature controllers, and temperature control valves.

The cooler 322 may remove sufficient thermal energy from the solid product 314 to allow the solid product 314 to pass through the lock hopper inlet valve 324 without damaging the lock hopper inlet valve 324 or the solid product 314. The design of the cooler 322 may be selected to provide the solid product 314 to the lock hopper inlet valve 324 below a rated operating temperature of the lock hopper inlet valve 324.

A purge gas 323 may optionally flow through the solid product 314 in the cooler 322 counter to the direction of flow of the solid product 314. That is, the purge gas 323 may flow through the cooler 322, through the inlet of the solids removal device 320, and into the reactor. The purge gas 323 may aid in cooling and may be at least partially preheated as it cools and flows through the solid product 314. Typically, the purge gas 323 includes one or more of the constituents of a reactive gas to be processed in the reactor. For example, in the system 300 illustrated in FIG. 5, all or a portion of the source gas 302 may enter the reactor 310 as the purge gas 323 counterflowing through the cooler 322. In embodiments in which solid carbon products are formed, the purge gas 323 may be a carbon oxide make-up gas (e.g., carbon dioxide). If the purge gas 323 has a density greater than the reactive gas 306 in the reactor 310, the purge gas 323 may blanket the solid product in the solids removal device 320, and depending on the design of the reactor 310, in the lower portion of the reactor 310.

In some embodiments, the lock hopper 326, when empty, is at a pressure lower than the pressure in the reactor from which the solid product 314 is removed. A pressure differential between the reactor and the lock hopper 326 results in the reactive gases in the reactor pushing the solid product 314 through the cooler and into the lock hopper 326 upon opening of lock hopper inlet valve 324. In yet other embodiments, the empty lock hopper 326 is purged with gases compatible with the reactive gases in the reactor as a final purge in preparation for the next discharge cycle from the reactor so that when lock hopper inlet valve 324 opens and the lock hopper 326 is in communication with the reactor, the gases in the lock hopper 326 that may flow into the reactor do not adversely affect the composition of the reactive gases in the reactor. In some cases, cool reactive gas may be used as a final purge of the empty lock hopper 326 so that the gases in the lock hopper and in the reactor are substantially the same. In other cases, one of the reactive gas constituents may be used for the final purge of the empty lock hopper 326.

The lock hopper 326 may be continuously cooled by providing a heat transfer fluid (e.g. air, water, oil, glycol, etc., or a mixture thereof) through or around the lock hopper 326. The heat transfer fluid may be the same fluid or a different fluid from that used to cool the solid product 314 in the cooler 322. In some embodiments, the lock hopper 326 is a jacketed vessel configured to have the heat transfer fluid flow within the jacket. The lock hopper 326 may include suitable controls for the flow of the heat transfer fluid, which are generally known in the art and not described in detail herein. For example, the lock hopper 326 may include one or more valves, backflow preventers, temperature sensors, temperature controllers, and temperature control valves.

The lock hopper 326 may remove sufficient thermal energy from the solid product 314 to allow the solid product 314 to pass through the lock hopper discharge valve 328 without damaging the lock hopper discharge valve 328 or the solid product 314. The design of the lock hopper 326 may be selected to provide the solid product 314 to the lock hopper discharge valve 328 below a rated operating temperature of the lock hopper discharge valve 328 and within a temperature range safe for handling.

In some embodiments, the lock hopper 326 may be purged in a series of purge steps with each cycle. Each of the purge steps may use a different purge gas mixture. The purge gas enters the lock hopper 326 through at least one purge gas inlet 327, flows through the lock hopper 326, and exits via at least one purge gas outlet 325 while both the lock hopper inlet valve 324 and lock hopper discharge valve 326 are closed. Purging the lock hopper includes opening valves on the purge gas outlet 325 and purge gas inlet 327 so that purge gases flow through the lock hopper 326 for a predetermined time. Various controls, valves, piping, etc., may be selected to enable the specific purge mode desired. Various safety interlocks with sensors, such as a sensor measuring the solid product temperature in the lock hopper 326, may be selected to assure safe operation of the solids removal device 320. Purge gas flows for a predetermined period of time to purge reactive gases from the lock hopper 326 or dilute the reactive gases to a selected level.

In some embodiments, the lock hopper 326 may be operated with a single-purge sequence. If a single purge gas can be selected that is compatible with the reaction gas in the reactor and is safe for discharge from the system on opening lock hopper discharge valve 328, the selected purge gas can eliminate explosion potential. The lock hopper inlet valve 324 opens, allowing a charge of solid product 314 and entrained reactive gas to flow to the lock hopper 326. The lock hopper inlet valve 324 then closes. The selected purge gas flows through the purge gas inlet 327, flows through the lock hopper 326 and exits through the purge gas outlet 325. The purge gas flows for a predetermined period of time to purge reactive gases from the lock hopper 326 or dilute the reactive gases to a selected level. The purge gas outlet 325 control valve closes while the purge gas continues to flow until the purge gas in the lock hopper 326 is brought to a predetermined pressure, whereupon the purge gas inlet 327 is closed to terminate the inlet flow. Pressure may be maintained in the lock hopper 326 by one or more back pressure regulators, flow control valves, metering valves, pressure control valves, etc., such as in the discharge line leading to the purge vent 325. Upon completion of purging and cooling to a selected temperature, the lock hopper discharge valve 328 opens, discharging the solid product to a drum, conveyor belt, or another product handling system, and the lock hopper discharge valve 328 closes. The lock hopper 326 is then ready for the next cycle.

If any gas incompatible with the reactive gases is used as a second purge gas 327, or if any gas incompatible with the reactive gases can enter the lock hopper 326 during the discharge cycle while the lock hopper discharge valve 328 is open, then a multi-step sequence may be used. In a multi-step sequence, at least one additional purge is added to the single-purge sequence described above.

In some embodiments, the purge process will have at least two steps in each cycle. The first step purges the lock hopper 326 with a gas or gas mixture that is compatible with the reactive gas mixture (e.g., reactive gas or one or more constituents thereof) as the first purge gas and brings the lock hopper 326 to a predetermined pressure that may be less than or equal to the pressure of the reactive gases in the reactor. The lock hopper inlet valve 324 then opens, and product and entrained reactive gas is discharged into the lock hopper 326, whereupon lock hopper inlet valve 324 closes. The second step purges the reactive gases from the lock hopper 326 by flowing a second gas (e.g., nitrogen, argon, carbon dioxide, etc.) as the second purge gas. This second purge gas may be selected to limit the risk of explosion or product combustion on exposure to air. The lock hopper discharge valve 328 then opens, and the solid product 314 and entrained second purge gas are discharged from the lock hopper 326, whereupon the lock hopper discharge valve 328 closes. The lock hopper 326 is then ready for the next cycle.

If there is any possibility of air getting into the lock hopper 326 while lock hopper discharge valve 328 is open, a third purge may be used to remove air from the lock hopper 326. The third purge removes air from the lock hopper 326 by flowing either the first purge gas (e.g., if there is no explosive danger in mixing air with the first purge gas), the second purge gas, or a third gas. This completes a typical purge cycle. Many variations on this basic purge cycle may be selected based on particular process requirements, environmental regulations, etc. Lock hoppers are widely used in the chemical process industries, and codes, standards, and industry best practices for particular reactive gases and products are mature.

In some embodiments, such as when making solid carbon products using the Bosch reaction, carbon dioxide is used both as the purge gas compatible with the reactive gases, and as the purge gas suitable for handling the solid product 314. In other embodiments, such as when making solid carbon products using hydrocarbon pyrolysis, a first purge gas including a hydrocarbon gas (e.g. ethylene, methane) is used as the purge gas compatible with the reactive gases, and a second purge gas including an inert gas (e.g. nitrogen, argon, or carbon dioxide) is used as the purge gas suitable for handling the solid product 314. The second purge gases may be selected to limit the possibility of explosion or other hazardous reactions during the purge cycles. The second purge gas remaining with the solid product 314 discharged from the solids removal device 320 may be selected to meet the needs of worker safety, environmental regulations, cost constraints, etc.

The reactors and systems described herein may be used to produce solid carbon products. When carbon-containing gases contact a catalyst material under suitable conditions of temperature and pressure, the carbon-containing gases decompose to form solid carbon. The allotrope and morphology of the solid carbon may be controlled by controlling the reactive gas composition, reaction temperature, and reaction pressure. Several reactions are commonly used to produce solid carbon, including hydrocarbon pyrolysis, the Boudouard reaction, the Bosch reaction and related reactions. Such reactions are disclosed in, for example, U.S. Patent Application Publication No. 2012/0034150 A1, entitled "Method for Producing Solid Carbon by Reducing Carbon Oxides," and published on Feb. 9, 2012.

The reaction conditions, including the temperature and pressure in the reactor 100, the residence time of the reactive gases, and the grain size, grain boundary, and chemical composition of the catalyst may be controlled to obtain solid carbon products of the desired characteristics. The tail gas is typically recycled, and as part of the recycle, passed through a condenser with each cycle to remove excess water and to control the partial pressure of the water vapor in the reactive gas mixture. The partial pressure of water is one factor that appears to affect the type and character (e.g., morphology) of solid carbon formed, as well as the kinetics of carbon formation with increases in the partial pressure of water reducing the rate of solid carbon formation.

Carbon activity ($A_c$) can be used as an indicator of whether solid carbon will form under particular reaction conditions (e.g., temperature, pressure, reactants, concentrations). Without being bound to any particular theory, it is believed that carbon activity is the key metric for determining which allotrope of solid carbon is formed. Higher carbon activity tends to result in the formation of CNTs, lower carbon activity tends to result in the formation of graphitic forms.

Carbon activity for a reaction forming solid carbon from gaseous reactants can be defined as the reaction equilibrium constant times the partial pressure of gaseous products, divided by the partial pressure of reactants. For example, in the reaction, $CO_{(g)}+H_{2(g)} \rightleftharpoons C_{(s)}+H_2O_{(g)}$, with a reaction equilibrium constant of K, the carbon activity $A_c$ is defined as $K \cdot (P_{CO} \cdot P_{H2}/P_{H2O})$. Thus, $A_c$ is directly proportional to the partial pressures of CO and $H_2$, and inversely proportional to the partial pressure of $H_2O$. Higher $P_{H2O}$ tends to inhibit CNT formation. The carbon activity of this reaction may also be expressed in terms of mole fractions and total pressure: $A_c = K \cdot P_T(Y_{CO} \cdot Y_{H2}/Y_{H2O})$, where $P_T$ is the total pressure and Y is the mole fraction of a species. Carbon activity generally varies with temperature because reaction equilibrium constants vary generally with temperature. Carbon activity also varies with total pressure for reactions in which a different number of moles of gas are produced than are consumed. Mixtures of solid carbon allotropes and morphologies thereof can be achieved by varying the catalyst and the carbon activity of the reactive gases in the reactor.

When solid carbon is produced by the reaction of carbon-containing gases with a catalyst material, a portion of the catalyst is generally incorporated in the structure of the carbon product. For example, in the formation of carbon nanotubes, a nucleating nanoparticle of catalyst material is typically encapsulated in the growth tip of each carbon nanotube. Therefore, in this type of reaction, the catalyst material is gradually consumed. For example, in less than approximately 2 hours at a temperature of about 650° C. and a pressure of about 1.48 MPa (about 200 psig), the growth of carbon nanotubes in an the presence of a reactive gas containing carbon dioxide and methane may entirely consume particles of iron that start as an 80 grit powder. Catalyst residual is typically under 0.5% by weight in the solid carbon product (i.e., the mass of carbon produced is typically at least 200 times the mass of iron consumed) but may range up to as much as 10% by weight depending on the quality of solid carbon produced. The catalyst material may have a density of between 6 and 10 times the density of the solid carbon formed in the reaction. The solid carbon is typically a light powdery material with a density of less than about 0.8 g/cm$^3$. Therefore, the solid carbon produced typically fills a volume in excess of 1200 times the volume of the catalyst consumed.

This difference in volume and density may provide a driving force to move solid products within the reactors described herein. This driving force may improve the economics of reactor design and of the systems in which such a reactor is used for the production of solid products, such as solid carbon, because removal of solid products may be simplified.

The method of operation may be analogized to a popcorn popper. The catalyst material (analogous to popcorn kernels) sits in a container and is exposed to the reactive gas. The solid product forms on the surface of the catalyst and the volumetric increase (analogous to the expansion of the popcorn kernels when popped) causes the solid product to billow above the catalyst material. Subsequent solids formation pushes prior solid products away from the surface of the catalyst material. The billowing solid products can then fall out of the catalyst container like popped popcorn exits a popcorn popper. The solid carbon can then be routed to a discharge system.

The catalyst material may include fine particles or fibers of catalyst. The catalyst material may optionally serve multiple purposes, as described herein, including as a catalyst, as filter media, and as water-gas reactor media for reacting fine solid particulates. Catalyst materials may be prepared from a wide variety of materials according to any of the procedures known to the art. For example, steel grit, steel shot, steel wool, and chopped steel wool are suitable catalyst materials for forming some solid products, such as carbon nanotubes.

Reactions forming solid products typically occur within a small distance from the surface of the catalyst material. If the bed of catalyst material is sufficiently thick, some of the catalyst material (e.g., catalyst material relatively farther from the surface of the bed) does not react with the reactive gases. The reaction mechanisms vary with the reaction chemistry for solid formation and include depletion of reactants or formation of by-products (such as water in the case of the Bosch or related reactions) that poison the catalyst. Regardless of the mechanism, as a portion of the catalyst material near the exposed surface is carried away in the solid product, underlying catalyst material is exposed. Continuous addition of new catalyst material at the bottom of the bed may maintain a selected constant bed depth.

The portion of the catalyst material that remains unreacted can be useful as a filter for inhibiting the passage of solid carbon into the tail gas discharge. The principles of designing sand filters and other particle-based filters are well known, and suitable designs will readily occur to the skilled practitioner. It is thus possible to design a catalyst system in which the catalyst feed rate is sufficient to continuously refresh the portion of the catalyst bed acting as a filter section so that solid products do not pass through the catalyst bed.

If water is injected into the catalyst bed, the solid products retained on the catalyst particles below that point may be consumed by reaction with the water. Under the reducing conditions typical of solid carbon production from gaseous precursors, solid carbon may react with water to form carbon monoxide or carbon dioxide, as shown in the following reactions:

$$2C_s + H_2O \Leftrightarrow 2CO + H_2;$$

$$C_s + 2H_2O \Leftrightarrow CO_2 + 2H_2.$$

In such embodiments, any carbon monoxide and carbon dioxide formed may be recycled back to the reactor.

304 stainless steel appears to catalyze the formation of CNTs under a wide range of temperatures, pressures, and gas compositions. However, the rate of formation of CNTs on 304 stainless steel appears to be relatively low for most reactive gas compositions, such that 304 stainless steel may be used effectively as a construction material for process equipment, with minimal deposition on surfaces thereof in some operations. 316L stainless steel, in contrast, appears to catalyze the formation of solid carbon at significantly higher rates than 304 stainless steel and in a wider variety of reactive gases, but may also form various morphologies of carbon. Thus, 316L stainless steel may be used as a catalyst to achieve high reaction rates, but particular reaction conditions may be maintained to control product morphology. Catalysts may be selected to include Cr, such as in amounts of about 22% or less by weight. For example, 316L stainless steel contains from about 16% to about 18.5% Cr by weight. Catalysts may also be selected to include Ni, such as in amounts of about 8% or more by weight. For example, 316L stainless steel contains from about 10% to about 14% Ni by weight. Catalysts of these types of steel have iron in an austenitic phase, in contrast to alpha-phase iron used as a catalyst in conventional processes. Given the good results observed with 316L stainless steel, the Ni and/or Cr may have a synergistic effect with Fe.

Various commercially available grades of metals may be used as catalysts, such as series-300 stainless steels.

Oxidation and subsequent reduction of the catalyst surface alter the grain structure and grain boundaries. Without being bound by any particular theory, oxidation appears to alter the surface of the metal catalyst in the oxidized areas. Subsequent reduction may result in further alteration of the catalyst surface. Thus, the grain size and grain boundary of the catalyst may be controlled by oxidizing and reducing the catalyst surface and by controlling the exposure time of the catalyst surface to the reducing gas and the oxidizing gas. The oxidation and/or reduction temperatures may be in the range from about 500° C. to about 1,200° C., from about 600° C. to about 1,000° C., or from about 700° C. to about 900° C. The resulting grain size may range from about 0.1 μm to about 500 μm, from about 0.2 μm to about 100 μm, from about 0.5 μm to about 10 μm, or from about 1.0 μm to about 2.0 μm. In some embodiments, the catalyst may be an oxidized metal (e.g., rusted steel) that is reduced before or during a reaction forming solid carbon. Without being bound to any particular theory, it is believed that removal of oxides leaves voids or irregularities in the surface of the catalyst material, and increases the overall surface area of the catalyst material.

Catalysts may be in the form of nanoparticles or in the form of domains or grains and grain boundaries within a solid material. Catalysts may be selected to have a grain size related to a characteristic dimension of a desired diameter of the solid carbon product (e.g., a CNT diameter). Catalyst powder may be formed in or near the reaction zone by injecting an aerosol solution such that upon evaporation or a carrier solvent, a selected particle size distribution results. Alternatively, powdered catalyst may be entrained in a carrier gas and delivered to the reactor. By selecting the catalyst and the reaction conditions, the process may be tuned to produce selected morphologies of solid carbon product. In some embodiments, the catalyst may be formed over a substrate or support, such as an inert oxide that does not participate in the reactions. However, the substrate is not necessary; in other embodiments, the catalyst material is an unsupported material, such as a bulk metal or particles of metal not connected to another material (e.g., loose particles, shavings, or shot, such as may be used in a fluidized-bed reactor).

What is claimed is:

1. A reactor, comprising:
a vessel having at least one outer wall and at least one inner wall, the at least one inner wall defining at least one inner chamber within the at least one outer wall;
a gas inlet configured to deliver a reactive gas into the vessel;
an inlet baffle configured to direct the reactive gas to blow at least a portion of a solid product from a top of the at least one inner chamber;
a solid product outlet configured to deliver the solid product from the vessel;
a porous catalyst support configured to at least partially retain a catalyst material and allow a tail gas to pass therethrough; and
a gas outlet separate from the solid product outlet and configured to deliver the tail gas from the catalyst support through the outer wall of the vessel;
wherein the gas inlet is in fluid communication with the solid product outlet.

2. The reactor of claim 1, further comprising a reactant inlet configured to deliver a reactant to the at least one inner chamber, wherein the reactant comprises at least one of water, water vapor, and steam.

3. The reactor of claim 1, wherein the at least one inner wall is configured so that solid material can pass between the at least one outer wall and the at least one inner wall to the solid product outlet.

4. The reactor of claim 1, wherein the porous catalyst support comprises a sintered ceramic or metal disk.

5. The reactor of claim 1, wherein the at least one outer wall comprises ceramic-lined steel.

6. The reactor of claim 1, wherein the vessel comprises a portion having a cross section narrowing toward the solid product outlet.

7. A system for producing a solid product, the system comprising:
a reactor comprising:
  a vessel having at least one outer wall and at least one inner wall, the at least one inner wall defining at least one inner chamber within the at least one outer wall;
  a gas inlet configured to deliver a reactive gas into the vessel;
  an inlet baffle configured to direct the reactive gas to blow at least a portion of a solid product from a top of the at least one inner chamber;
  a solid product outlet configured to deliver the solid product from the vessel;
  a porous catalyst support configured to at least partially retain a catalyst material and allow a tail gas to pass therethrough; and
  a gas outlet separate from the solid product outlet and configured to deliver the tail gas from the catalyst support through the outer wall of the vessel;
  wherein the gas inlet is in fluid communication with the solid product outlet;
a compressor configured to circulate a reactive gas through the reactor;
a heater configured to heat the reactive gas to a reaction temperature;
a make-up reactive gas inlet configured to deliver reactive gas to the reactor to maintain a constant mass of reactive gas in the reactor; and
a solids discharge configured to remove the solid product from the solid product outlet of the reactor.

8. A method of forming a solid product, comprising:
providing a catalyst material in the reactor of claim 1;
delivering a reactive gas to the reactor;
reacting the reactive gas in the presence of the catalyst material to form a solid product and a tail gas in the reactor;
passing the tail gas through at least a portion of the catalyst material to separate the solid product from the tail gas;
replacing catalyst that is entrained in the solid product or otherwise removed from the reactor;
continuously removing the tail gas from the reactor and recycling at least a portion of the tail gas to become at least a part of the reactive gas; and
continuously removing the solid product from the reactor.

9. The method of claim 8, further comprising:
providing water in the reactor; and
mixing the tail gas with the water.

10. The method of claim 8, further comprising selecting the reactive gas to comprise at least one gas selected from the group consisting of hydrocarbons and alcohols.

11. The method of claim 8, further comprising selecting the reactive gas to comprise at least one carbon oxide.

12. The method of claim 8, further comprising removing water from the tail gas.

13. The method of claim 8, wherein providing a catalyst material in the reactor comprises continuously introducing catalyst material into the reactor.

14. The method of claim 8, wherein providing a catalyst material in the reactor comprises providing particles or fibers of catalyst material into the reactor.

15. The method of claim 14, wherein providing particles or fibers of catalyst material into the reactor comprises providing at least one material selected from the group consisting of steel grit, steel shot, steel wool, and chopped steel wool.

16. The method of claim 8, wherein reacting the reactive gas in the presence of the catalyst to form a solid product and a tail gas comprising water in the reactor comprises forming carbon nanotubes.

17. The method of claim 8, further comprising selecting the reactive gas to include a mixture of a carbon oxide and a reducing agent.

18. The method of claim 17, wherein selecting the reactive gas to comprise a mixture of a carbon oxide and a reducing agent comprises selecting the reactive gas to include at least one gas selected from the group consisting of hydrogen and methane.

19. The method of claim 17, wherein selecting the reactive gas to comprise a mixture of a carbon oxide and a reducing agent comprises selecting the reactive gas to comprise at least one gas selected from the group consisting of carbon monoxide and carbon dioxide.

* * * * *